Feb. 15, 1944. J. SPOTA 2,341,666
FILM DEVELOPING APPARATUS
Filed April 4, 1942
*Fig. 1.*
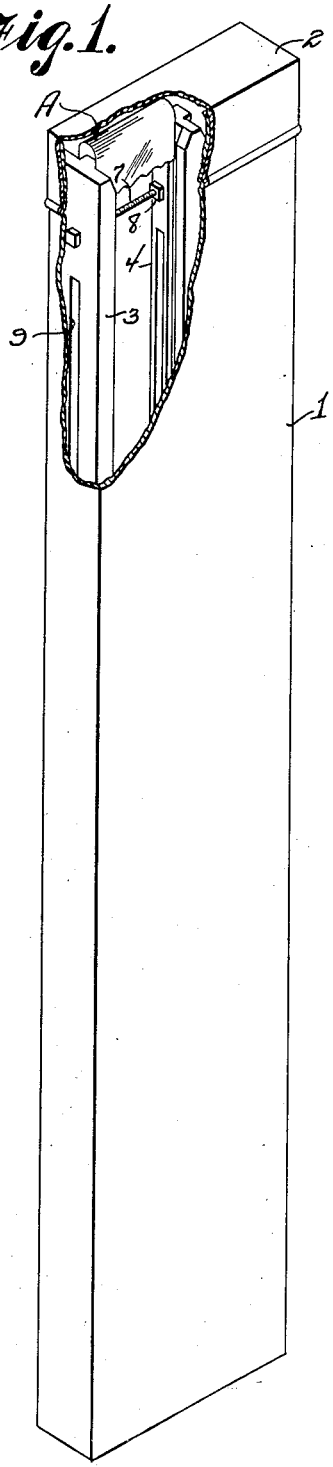
*Fig. 2.* *Fig. 3.*
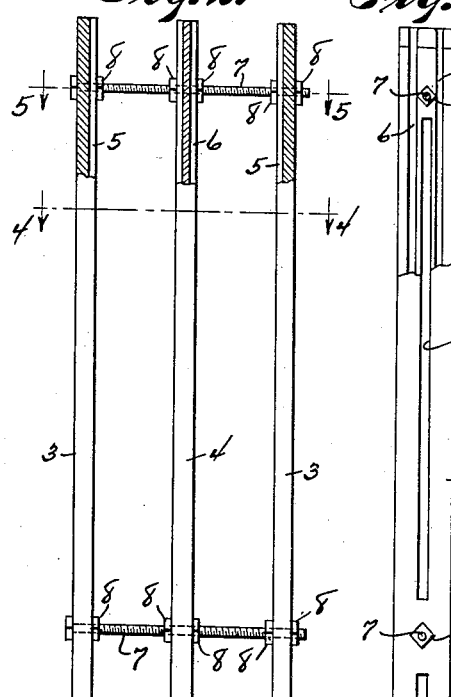
*Fig. 4.*
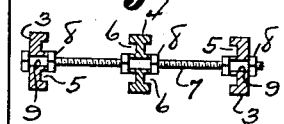
*Fig. 5.*
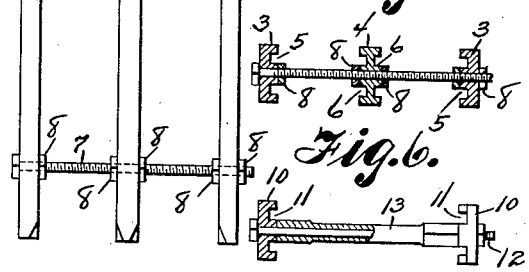
*Fig. 6.*
Joseph Spota INVENTOR.
BY
Victor J. Evans & Co.
ATTORNEYS Patented Feb. 15, 1944

2,341,666

UNITED STATES PATENT OFFICE 2,341,666

FILM DEVELOPING APPARATUS

Joseph Spota, New York, N. Y.

Application April 4, 1942, Serial No. 437,674

2 Claims. (Cl. 95—100)

This invention relates to developing apparatus for roll type photographic films, and its general object is to provide an apparatus that can be readily loaded and unloaded in total darkness, in that it includes an elongated film receiving rack and a tank therefor, the rack being constructed to materially facilitate application and removal of the film with respect thereto, as it is provided with grooves along its length for slidably receiving the film and to retain the same relative to the rack against removal or displacement.

A further object is to provide a developing apparatus that includes a film receiving rack which is adjustable for films of various widths, and is also designed for receiving two rolls of film for simultaneously developing the same.

Another object is to provide a developing apparatus that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a perspective view of my apparatus, with the upper portion of the tank broken away to illustrate the rack therein.

Figure 2 is a front view of the rack, partly in section.

Figure 3 is a fragmentary side view of the rack, with an outer bar broken away.

Figure 4 is a sectional view taken approximately on line 4—4 of Figure 2, looking in the direction of the arrows.

Figure 5 is a sectional view taken approximately on line 5—5 of Figure 2, looking in the direction of the arrows.

Figure 6 is an end view of a modified form, partly in section.

Referring to the drawing in detail, it will be noted that the tank is of relatively narrow elongated configuration and includes a body 1 of rectangular cross section having an open upper end closed by a cap like cover 2.

The rack is of a height so that when it rests upon the bottom of the tank, the upper end of the rack will be spaced below the upper end of the tank, an ample distance for the film to be entirely submerged within the solution, and whereby the rack can be readily gripped for removing the same from the tank, as will be apparent from Figure 1.

The rack of the form as shown in Figures 2 to 5 includes a pair of outer bars 3 and an intermediate bar 4, as this form is designed to develop two rolls of film at a time. Each outer bar 3 is identical and is provided with a flat outer side face, but the inner side face is provided with a pair of parallel film guiding and retaining grooves 5 extending longitudinally thereof throughout its length. The intermediate bar is provided on each side face, with a pair of longitudinally extending film guiding and retaining grooves 6 throughout the length thereof.

The bars are connected together in parallelism with each other with the grooved faces of course in confronting relation, by bolts 7 and nuts 8, the bolts extending transversely through the bars and having heads bearing against the outer face of one outer bar. The bolts are threaded for the major portion of their length and each bolt is provided with five nuts 8, one that bears against the inner face of the last mentioned bar for holding the latter fixed against the heads, two that bear against the side faces of the intermediate bar and two that bear against the side faces of the other outer bar, with the result it will be obvious that the last mentioned outer bar and intermediate bar which are slidably mounted on the bolts can be adjusted along the length thereof to vary the space between the bars to fit films of various widths. It will be further obvious that the intermediate bar can be removed, for use of the side bars alone, when it is desired to develop a film that is too wide to fit between the intermediate bar and the outer bars.

The bars are preferably slotted along the longitudinal centers thereof as at 9, with the slots terminating adjacent the bolt holes. The corners of the ends of the intermediate bar are beveled and the inner corners of the ends of the outer bars are likewise beveled, so as to facilitate inserting the film within the grooves, the film being indicated by the letter A in Figure 1.

The form of Figure 6 includes two bars 10 only, each having a pair of film guiding and retaining grooves 11 in the inner faces thereof, and while the bars 10 are secured together by bolt and nut connections 12, they are not adjustable and are held in spaced relation by sleeves 13 bearing against the inner faces thereof.

From the above description and disclosure in the drawing, it is believed that the use of my apparatus will be obvious, but it might be mentioned that the film is first inserted in one of the ends of registering grooves on one side of the rack and pulled through the same, thence the film is looped about the opposite end of the rack and inserted in corresponding registering grooves on the other side thereof. The loaded rack is then mounted in the tank for the developing solution to act upon the film. It will be further obvious that due to the simple manner of applying the film to the rack that such can be done in total darkness, thus preventing any possibility of exposing the film to light.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A film developing rack comprising a pair of outer elongated bars, each of the said bars having a flat outer face and a pair of spaced grooves extending the full length of the inner face, an intermediate bar having each opposed face provided with a pair of spaced grooves extending the full length thereof, the said outer and intermediate bars having aligned openings adjacent each end and at their medial portions, a bolt extending through the respective aligned openings, and nuts threaded on the bolt shanks and bearing against the respective bars to hold the latter in spaced parallel assembly.

2. In a film developing rack, a pair of elongated outer flat bars, each of the said bars having a pair of transversely spaced grooves extending the full length of the inner face so as to provide an intermediate relatively wide rib and a narrower rib at each side, an intermediate flat bar having transversely spaced grooves extending the full length of each opposed face to define a relatively wide center rib and narrower side ribs, the said outer and intermediate bars having aligned transverse openings through the end portions and the intermediate portion and extending through the center rib thereof, each of the said bars having longitudinal slots extending between the transverse openings, a threaded bolt extending through the respective aligned openings of the bars at the ends and intermediate portion, the outer ribs of each bar being beveled at the ends, and nuts threaded on the said bolts for holding the bars in selectively spaced parallel assembly.

JOSEPH SPOTA.